Patented Feb. 18, 1930

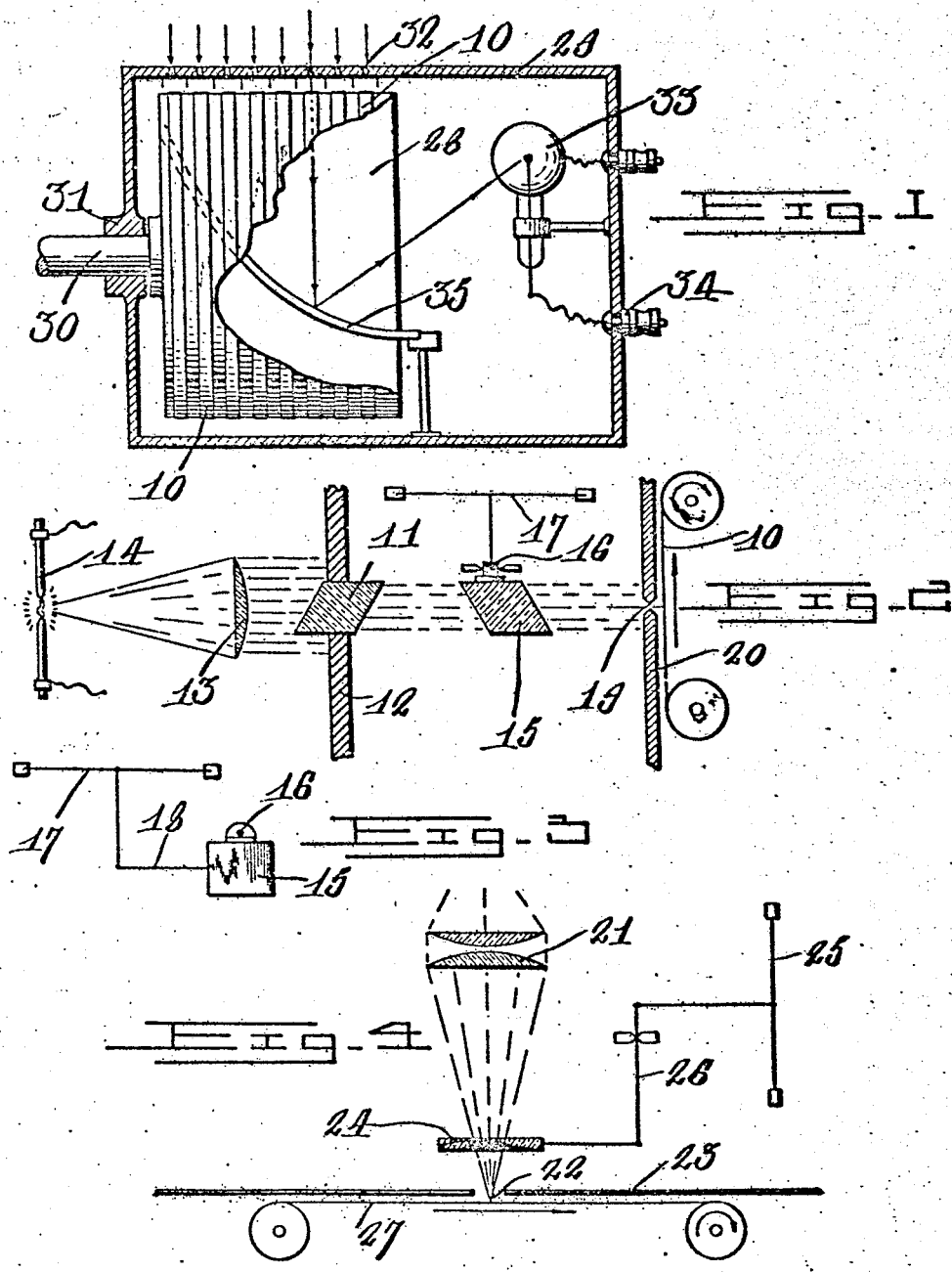

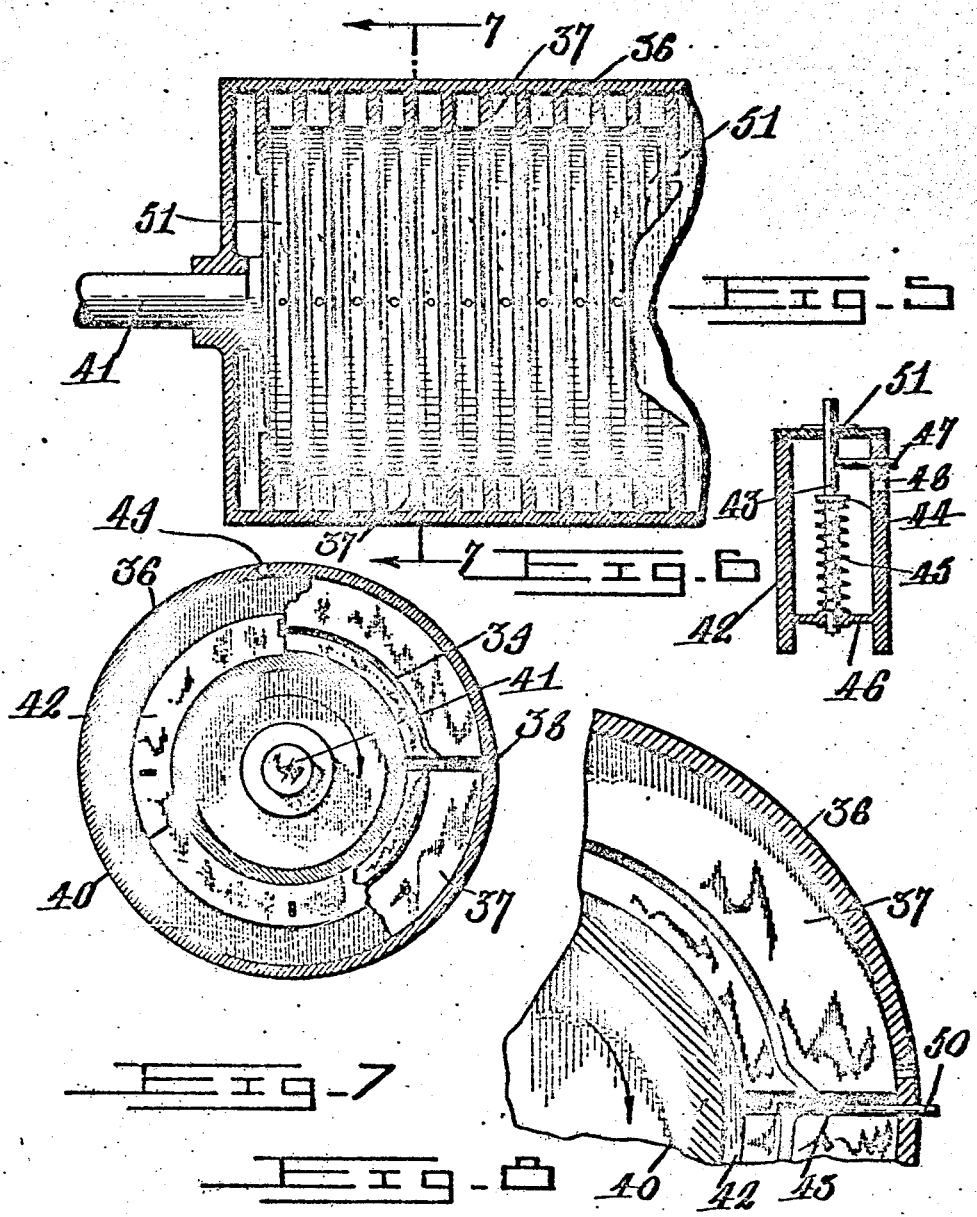

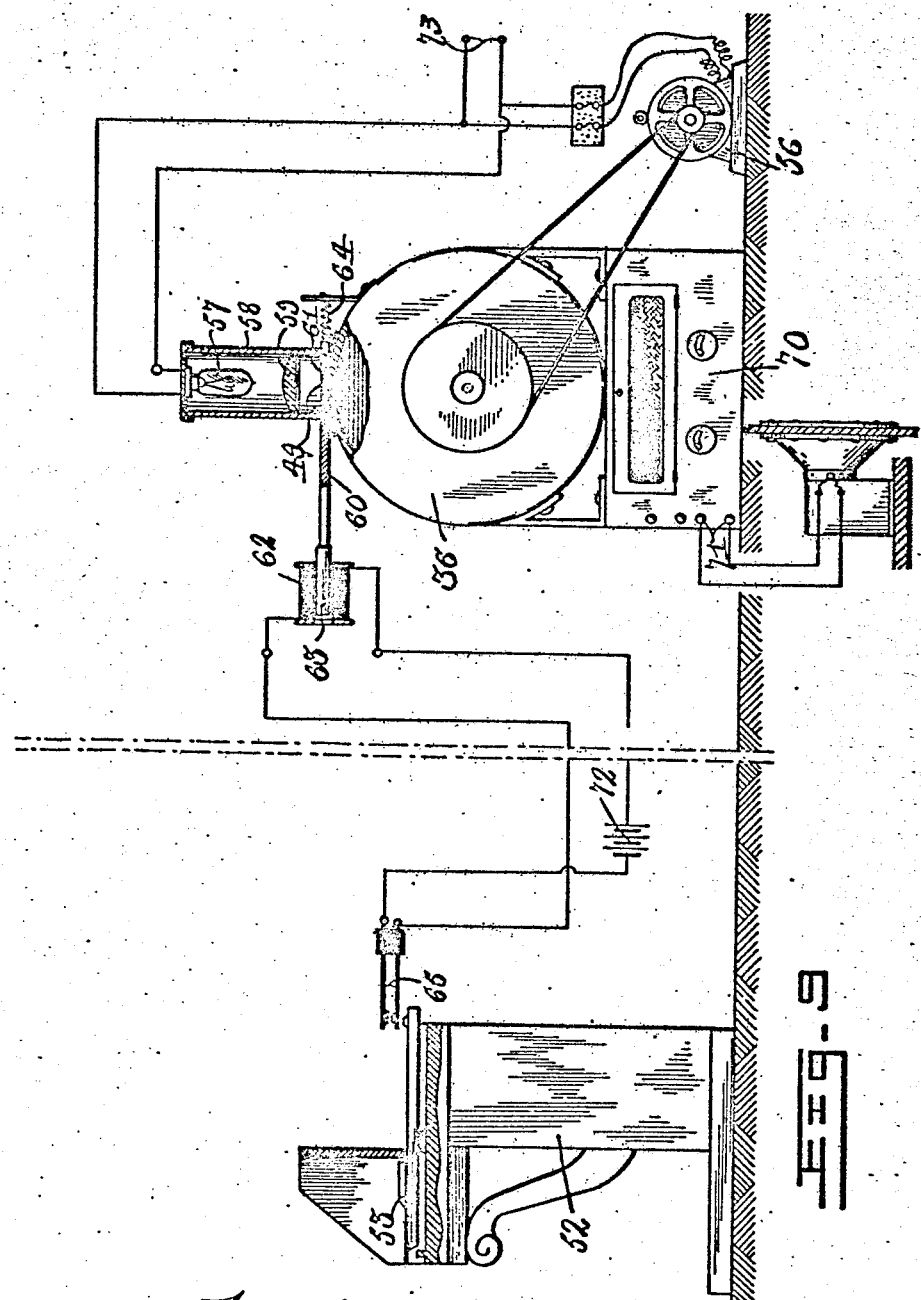

1,747,936

UNITED STATES PATENT OFFICE

FRANÇOIS C. P. HENROTEAU, OF OTTAWA, ONTARIO, CANADA

SOUND-REPRODUCING APPARATUS

Application filed October 13, 1927. Serial No. 226,018.

The present invention relates to sound reproducing apparatus and has particular reference to such an apparatus in which the sounds are reproduced by means of radiant energy.

An important object of the invention is the provision of an apparatus for selectively reproducing vocal or instrumental compositions.

A further object of the invention is the provision of an apparatus whereby vocal and instrumental, particularly musical sounds may be reproduced in selective composition and in variable volume.

Another object of the invention is the provision of sound reproducing apparatus embodying a sensitized member on which are recorded the individual notes of an instrument by means of light projection and formed so that the sound can be reproduced in a similar manner therefrom.

Still another object of the invention is the provision of an apparatus whereby various selections can be reproduced by the operation of a key-board designed to intermittently expose sensitized members each constructed to reproduce the individual notes of an instrument when exposed to a light ray for the production of harmonic composition.

A further object of the invention is the provision of an apparatus for recording sounds upon a film or similar sensitized element.

Another object of the invention is the provision of apparatus for reproducing sounds by selective light projection through a sensitized element and suitable amplification.

Another object of the invention is the provision of an apparatus wherein the individual notes of an instrument are recorded upon individual reproducing elements and the elements selectively exposed to a penetrating light ray whereby the notes will be reproduced in variable volume.

Other objects and advantages of the invention will become apparent as the description progresses.

In the accompanying drawings forming a part of this specification and in which like reference characters are employed to designate corresponding parts throughout the same:

Figure 1 is a vertical longitudinal section of the reproducing apparatus,

Figure 2 is a diagrammatic illustration of the sound recording apparatus,

Figure 3 is a transverse section taken through the structure shown in Figure 2,

Figure 4 is a modified form of a recording apparatus,

Figure 5 is a longitudinal section through a modified form of a sound reproducing apparatus, Figure 6 is an enlarged detail cross section of one of the cylinders shown in Figure 5, Figure 7 is a fragmentary transverse sectional view taken on the line 7—7 of Figure 5, Figure 8 is an enlarged fragmentary section of the structure shown in Figure 7, and Figure 9 is a diagrammatic representation of a suggested form of embodiment of the invention.

Referring to the drawing, the apparatus forming the subject matter of the present invention embodies a sensitized element in the form of a plate or as designated at 10, in the form of a film. The sounds to be reproduced are initially recorded on the film 10 by radiant projection apparatus which may be in the form of a recorder shown in Figure 2 or Figure 4. The film is then mounted in a suitable reproducing mechanism whereby the sounds are selectively reproduced according to predetermined composition.

The essential feature of the present invention, is the reproduction of the sounds of the human voice or of any musical instrument. For the purpose of illustration, the reproduction of the musical effect of an organ and a piano will be particularly described. With this in mind, it will be noted that each individual note of the instrument is recorded, by means of light projection, upon an individual film of predetermined length. In the reproduction of the musical sounds, the films which are of transparent structure are rigidly secured in successive series upon a transparent rotatable member and selectively reproduced by the projection of a light ray controlled by a key-board or similar controlling mechanism and arranged to reproduce the sounds through a photo-electric or selenium cell which is operatively connected with an amplifying unit.

The sound is preferably recorded on the films by means of an apparatus as shown in Figure 2 embodying a Nicol prism 11 fixed in an opening of a stationary panel 12. At one side of the prism 11 is supported a lens 13 in the path of a powerful light beam projected from an arc light 14 or the like. Arranged on the opposed side of the prism 11 in the path of the polarized light beam issuing from the prism is a complementary Nicol prism 15 pivotally supported for delicate pivoting movement by means of a connection 16. The prism 15 is arranged substantially at right angles to the initial prism 11 and is connected with a vibratory diaphragm 17 by means of an angular link connection 18. The beam of light issuing from the intermediate prism 15 is considerably reduced in intensity and is directed through a recess 19 mounted in a fixed panel 20. The recess 19 forms a focus through which the light is projected onto the film 10. From this construction it will be noted that the vibratory movement of the diaphragm 17 will oscillate the intermediate Nicol prism 15 so as to accurately record the light variations upon the film. The film is then developed and employed in a reproducing mechanism.

As shown in Figure 4, a modified form of recording apparatus embodying a pair of inverted lenses 21 through which a light beam is focused, for projection through an opening 22 of a shield or panel 23, is also provided. The light beam is projected through a photographic wedge or similar plate 24 having a body of variable transparency to reduce the intensity of the beam. The plate 24 is longitudinally vibrated in the path of the beam simultaneously with the vibration of a diaphragm or microphone recorder through the instrumentality of a toggle connection 26 arranged to magnify the vibration of the plate 24. The beam will then record the sound vibrations upon a film indicated at 27 which is moved at a uniform speed adjacent the focus opening 22. The film may be produced in negative form from which a number of positive copies could be reproduced.

The sound recorded on the film is selectively reproduced in a reproducing mechanism which would be constructed in accordance with the particular type of instrument employed. The reproducing construction shown in Figure 1 is applicable for the reproduction of the musical sound of wind instruments, such as organs. In this instance, the strips 10 are fixed upon the periphery of a cylindrical transparent drum positioned in a light excluding casing 29. The drum 28 is attached to a shaft 30 extending concentrically from one end and journaled in a bearing 31 formed in one end of the casing. The film strips 10 are arranged in uniformly spaced successive positions, as clearly shown in Figure 1, in opposed positions to a series of longitudinally aligned apertures 32 formed in the side wall of the casing and normally closed by adjustable closure valves. The closure valves may be operated by any preferred type of mechanism, preferably a keyboard which, in the present instance, may be an exact simulation of an organ key-board. Mounted in one end of the casing 29 is a photo-electric cell 33 having electric connection with a pair of terminals 34 which are also connected with any well known type of amplifying unit. Rigidly supported within the drum 28 and curved to reflect the light beams projected through the respective films and drum on the photo-electric cell is a reflector 35. The reflector may be formed of parabolic curvature and the cell 33 arranged at the normal focus point.

In the operation of the device, the transparent drum 28 is rotated at a uniform rate of speed by any preferred type of motor connected with the shaft 30. The apertures 32 of the casing are selectively opened to admit a strong beam of light which will be projected through the films and reflected to the photo-electric cell 33. In this manner, the sound will be transmitted to the amplifier and reproduced in predetermined volume. As previously indicated, the light projection through each of the films 10 will produce the audible effect of an individual not of the instrument so that various compositions can be reproduced as in the actual production of music from the complete instrument. Inasmuch as the notes of an organ or similar wind instrument are of consistent value, the projection of light through the respective films on the drum, in any position, will produce music of harmonious character. Where, however, the reproduction of stringed instruments or similar musical apparatus is contemplated, wherein the respective tones are of diminishing value, it is necessary to employ a particular type of reproducing structure so that the exact sound of the original instrument can be properly reproduced.

With this in mind, I provide a modified form of reproducing mechanism as illustrated in Figures 5 to 8 inclusive. This form of reproducer is constructed so that each film will be mounted on a distinct, independently rotatable support member whereby the light beam will be initially projected through the films at a predetermined full tone position regardless of the time variation of the individual notes. This is effected by the provision of a cylindrical casing 36 formed with a series of uniformly spaced, inwardly projecting annular partitions 37. These partitions are divided radially in the form of sections, preferably four uniform sections separated by slots 38. In the sides of the partition sections, adjacent the inner edges, are formed concentric grooves 39 arranged in continuous formation and communicating with the dividing slots 38.

A transparent cylinder 40 is concentrically supported in the casing 36 by means of a rotary shaft 41 connected with and driven by a suitable motor. Loosely positioned about the peripheral surface of the cylinder 40 and disposed between the partitions 37, are a series of annular transparent rings 42 of U-shaped cross section. Operatively mounted at spaced positions, in the rings 42 in correspondence with the slots 38 in the partitions, are spring pressed triggers 43 carrying fixed collars 44 against which the outer end of a compression spring 45 engages. The inner end of the trigger 43 is slidably fitted through a transverse plate 46, the inner end of the spring 45 bearing against this plate and adapted to normally project the outer end of the trigger 43 through an opening in the peripheral edge of the ring. The radial reciprocating movement of the trigger 43 is controlled by a laterally projecting finger 47 which operates in an elongated slot 48 formed in the side of the ring. As shown to advantage in Figure 7, the casing 36 is formed with light admitting openings 49, there being an individual opening arranged to register with each ring 42. Similar openings are formed through the shell of the casing for the projection of slidable push rods 50 adapted to be radially actuated to engage the triggers.

As described in the foregoing, this particular type of reproducing apparatus is to be employed for the reproduction of piano and similar instrumental selections. Due to the diminishing audible effect of piano notes, it is necessary that the light projection, selectively produced in the casing, initially project through the films indicated at 51 and secured about the peripheral surface of each ring, at a predetermined position so that each note will initially produce its full volume and gradually diminish in simulation of the original instrument. This essential effect is reproduced by the trigger mechanism, as will be hereinafter described. Arranged in the interior of the cylinder 40, in a similar manner to the structure of the reproducing mechanism shown in Figure 1, is mounted a curved reflector arranged to deflect the light beam projected through the films upon the photoelectric cell through the medium of which the sound is produced through an amplifying unit.

In operation of the reproducing structure described in the foregoing, the interior cylinder 40 is rotated at a uniform predetermined speed. The film carrying rings 42 are normally held in a stationary position on the cylinder by the trigger mechanism, the trigger 43 being normally extended by the action of the spring 45 so that the finger 47 projects laterally from one side of the ring in one of the slots 38 of the partition, as shown to advantage in Figures 7 and 8. When it is desired to reproduce the musical note of a particular film strip, the trigger 43 is depressed by means of the push rod 50 simultaneously with the opening of the adjacent light admitting opening 49. Thus, as the light is projected through the film at the full volume position of the note the ring 42 will be released from the partition and will be rotated with the interior cylinder 40, the lateral projection of the finger 47 moving in the groove 39 of the particular partition section for approximately one fourth of a revolution at which position it will automatically engage the next successive slot 38 to again lock the ring in stationary position. During the movement of the ring, the complete diminishing value of a note will be sounded so that the complete audible effect is reproduced. This reproducer may also be conveniently operated from a key-board, in this instance simulating a piano key-board and arranged so that the push rods 50 will be operated simultaneously with the admission of the sound producing light beam.

From the foregoing description and the drawings, it will be readily apparent that the present invention provides an apparatus for the production of instrumental as well as vocal sounds which may be reproduced in selective composition. The sound reproducing elements are perfectly produced by recording the notes of the better grade of instruments so that the reproducing mechanism will audibly effect the highest grade of music. Inasmuch as the reproducing apparatus may be readily constructed in comparatively small compact form, the advantage from the standpoint of economy compared to the cost of the actual instrument is obviously very substantial as well as the saving of space required for the larger instruments, such as organs and the like. In the reproduction of musical selections of organs, pianos and like instruments, the present apparatus can be operated from a key-board similar to that employed in the original instrument or, if desirable, by a special key-board designed for this particular purpose. Furthermore, the present apparatus will be extremely durable and convenient in operation due to the relatively simple construction thereof.

For purposes of illustration, and as a suggested use to which the invention can be put, an instrument will now be described: said instrument being shown diagrammatically in Fig. 9. The instrument to be described is adapted to be used as a piano and, therefore, reproduces piano music. As shown, the complete apparatus comprises a console 52 very similar to that used in organs and having a plurality of key bars 53. The sound reproducing device proper is shown at 36 and the inside drum 40 is rotated by means of the small electric motor 56. On top of the casing and opposite the apertures 49 is placed a concentrated filament lamp 57; said lamp being enclosed in a casing 58 and the rays of which are collected by a plano-convex lens 59 to project into the casing parallel rays of light.

To selectively introduce into the casing, and subsequently unto the film, the said rays of light, it is necessary that said means be devised to either cover or uncover the apertures 49. For this purpose, a bar 60 is disposed over said apertures and having a second aperture 61 in the central part thereof. The movements of the bar 60 are controlled by a solenoid 62 having a core 63 to which the bar 60 is secured. Now, if we energize the solenoid, the core 63 will be urged inwardly into the solenoid drawing therewith the bar 60. This movement is so regulated that when the bar 60 is withdrawn the apertures 49 and 61 coincide so that the rays emitted by the lamp will reach the film and casing through said film and rotor 42 and affect the operations of the photo-electric cell (Fig. 1). When the solenoid is deenergized, the bar 60 is immediately retracted to the right by the spring 64 attached to one end of said bar and to securing means on the casing.

The operation of the solenoid is controlled by contacts 65 actuated by the keys.

From an inspection of Figure 9, it will be seen that loud-speakers can be connected to the output terminals 71 and also that the solenoid 62 is preferably energized by a battery 72, and finally that the motor 56 and lamp 57 are both connected to the supply terminal 73.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:—

1. An apparatus of the character described comprising a plurality of transparent elements, a light impervious casing provided with a series of openings adapted for selective projection of a beam of light therethrough, a hollow transparent carrier member mounted for rotary movement in the casing and arranged so that the sensitized elements can be fixed in series thereon adjacent the openings in the casing, a photo-electric cell mounted in one end of the casing, a sound amplifying apparatus operatively connected with the said cell, and a reflecting member positioned within the rotary carrier adapted to reflect the light beams projected through the sensitized elements and carrier on to the cell for reproduction of the sounds recorded thereon.

2. An apparatus for the reproduction of sound comprising a series of films upon which are recorded oscillating amplitudes of the individual notes of a sound producing instrument, a light impervious casing provided with a plurality of spaced openings in one side thereof, a film carrying cylinder rotatably mounted within the casing and arranged so that the film can be secured about the periphery therefrom in successive series in opposed position to the openings in the casing, a radio active cell supported in the casing, a sound amplifier mechanism operatively connected with the cell and a reflecting member positioned in the rotatable cylinder adapted to project the beams of light selectively projected through the sensitized film and cylinder on to the cell for reproduction of the sounds of the films.

3. An apparatus for reproducing sounds comprising a light impervious casing, a plurality of transparent rotatable carrier members in said casing, a central drum inside said members and adapted to be rotated by suitable means, transparent films secured on the periphery of said members, said films having recorded thereon the oscillating amplitudes of a note of a sound producing instrument, means for selectively projecting through any desired films a light beam according to the note it is desired to play, a reflecting member inside the transparent members for focussing the light beams unto a photo-electric cell, an audio-frequency amplifier connected to said cell, and means for starting and stopping the individual transparent members at a predetermined position.

4. An apparatus for reproducing sounds, comprising a light impervious casing, a plurality of transparent rotatable carrier members in said casing, a central drum inside said members and rotatable by outside means, transparent films secured on the periphery of said members and having recorded thereon the oscillating amplitudes of a note of a sound producing instrument, means for selectively driving the parallel members by the central drum, means for selectively projecting through any desired film or films a light beam, a reflecting member inside the parallel members for focussing the light beams unto a photo-electric cell, an audio-frequency amplifier connected to said cell and means for starting and stopping the individual transparent members at a predetermined position.

In witness whereof I have hereunto set my hand.

FRANÇOIS C. P. HENROTEAU.